(12) United States Patent
Tan et al.

(10) Patent No.: US 9,027,108 B2
(45) Date of Patent: May 5, 2015

(54) SYSTEMS AND METHODS FOR SECURE FILE PORTABILITY BETWEEN MOBILE APPLICATIONS ON A MOBILE DEVICE

(71) Applicant: Box, Inc., Los Altos, CA (US)

(72) Inventors: Simon Tan, Daly City, CA (US); David Scott Maynard, Menlo Park, CA (US); Rico Yao, San Jose, CA (US); Don Cung, Palo Alto, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/776,358

(22) Filed: Feb. 25, 2013

(65) Prior Publication Data

US 2013/0332723 A1    Dec. 12, 2013

Related U.S. Application Data

(60) Provisional application No. 61/650,840, filed on May 23, 2012, provisional application No. 61/697,437, filed on Sep. 6, 2012.

(51) Int. Cl.
*H04L 29/06* (2006.01)
*G06F 21/60* (2013.01)
(Continued)

(52) U.S. Cl.
CPC ........ *H04L 63/0428* (2013.01); *H04L 63/0807* (2013.01); *G06F 21/606* (2013.01); *H04L 63/04* (2013.01); *G06F 21/31* (2013.01); *G06F 21/53* (2013.01)

(58) Field of Classification Search
None
See application file for complete search history.

(56) References Cited

U.S. PATENT DOCUMENTS 5,799,320 A    8/1998    Klug
5,848,415 A    12/1998    Guck
5,864,870 A    1/1999    Guck
(Continued)

FOREIGN PATENT DOCUMENTS

CA    2724521    11/2009
CN    101997924 A    3/2011
(Continued)

OTHER PUBLICATIONS

Parr, "Google Docs Improves Commenting, Adds E-mail Notifications," Apr. 16, 2011, mashable.com, pp. 1-6.
(Continued)

*Primary Examiner* — David Pearson
(74) *Attorney, Agent, or Firm* — Perkins Coie LLP

(57) ABSTRACT

Systems and methods for secure file portability between mobile applications in a cloud-based environment or cloud-based collaboration and file sharing environment. In one embodiment, a server-based key generation service generates an encryption key that is unique to each file transfer transaction between mobile applications accessed via a mobile device. Data packages leaving a mobile application are then encrypted using the encryption key to provide secure file portability between mobile applications. In another embodiment, a background service triggered by a mobile application detects when a user is logged out of the mobile application and revalidates the user session with the mobile application to maintain portability of files between mobile applications. The background service presents a minimal user interface to get the user's credentials for the mobile application, without the user having to switch to the mobile application, and obtains an authentication token from a remote server using the user's credentials.

26 Claims, 11 Drawing Sheets

(51) Int. Cl.
*G06F 21/31* (2013.01)
*G06F 21/53* (2013.01)

(56) References Cited

U.S. PATENT DOCUMENTS

| | | |
|---|---|---|
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,347,276 B2 | 1/2013 | Schadow |
| 8,358,701 B2 | 1/2013 | Chou et al. |
| 8,429,540 B1 | 4/2013 | Yankovich et al. |
| 8,464,161 B2 | 6/2013 | Giles et al. |
| 8,527,549 B2 | 9/2013 | Cidon |
| 8,549,066 B1 | 10/2013 | Donahue et al. |
| 8,549,511 B2 | 10/2013 | Seki et al. |
| 8,607,306 B1 * | 12/2013 | Bridge et al. ............. 726/1 |
| 8,849,955 B2 | 9/2014 | Prahlad et al. |
| 2001/0027492 A1 | 10/2001 | Gupta |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0038934 A1 | 2/2007 | Fellman |

(56) References Cited

U.S. PATENT DOCUMENTS

| | | |
|---|---|---|
| 2007/0079242 A1 | 4/2007 | Jolley et al. |
| 2007/0100830 A1 | 5/2007 | Beedubail et al. |
| 2007/0115845 A1* | 5/2007 | Hochwarth et al. .......... 370/252 |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1* | 9/2007 | Rasmussen et al. .............. 726/4 |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |

(56) References Cited

U.S. PATENT DOCUMENTS

| | | |
|---|---|---|
| 2011/0093567 A1 | 4/2011 | Jeon et al. |
| 2011/0099006 A1 | 4/2011 | Sundararaman et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1* | 6/2011 | Haynes et al. ............... 715/766 |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1* | 2/2012 | Lim et al. ..................... 713/189 |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0092055 A1 | 4/2012 | Peschke et al. |
| 2012/0110005 A1 | 5/2012 | Kuo et al. |
| 2012/0110436 A1 | 5/2012 | Adler, III et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1* | 3/2013 | Cheung et al. ............... 713/176 |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0305039 A1 | 11/2013 | Gauda |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1 | 5/2014 | Gudorf et al. |
| 2014/0156373 A1 | 6/2014 | Roberts et al. |
| 2014/0172595 A1 | 6/2014 | Beddow et al. |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |

(56) References Cited

FOREIGN PATENT DOCUMENTS

| WO | WO-2004097681 A1 | 11/2004 |
|---|---|---|
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |

OTHER PUBLICATIONS

"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine. com, pp. 1-32.
International Search Report and Written Opinion for PCT/US2010/070366, Applicant: Box, Inc., Mailed Mar. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
International Search Report and Written Opinion for PCT/US2008/012973 dated Apr. 30, 2009, pp. 1-11.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Palmer, "Load Balancing FTP Servers," BlogNav, Oct. 2008, 2 pages.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/039782, Applicant: Box, Inc., Mailed Aug. 28, 2013, 15 pages.
Patent Court Document of Approved Judgment for GB0602349.3 and GB0623571.7; Mar. 3, 2009, 17 pages.
International Search Report and Written Opinion for PCT/US2013/034765, Applicant: Box, Inc., Mailed Jan. 20, 2014, 15 pages.
Exam Report for EP13185269.1, Applicant: Box, Inc. Mailed Jan. 28, 7 pages, 2014.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 13 pages.
"Average Conversion Time for a D60 RAW file?" http://www.dpreview.com, Jul. 22, 2002, 4 pages.
"Revolving sync conflicts; frequently asked questions," Microsoft Tech Support, Jul. 16, 2012, retrieved from the Internet: http://web.archive.org/web, 2 pages.

(56) References Cited

OTHER PUBLICATIONS

"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Burns, "Developing Secure Mobile Applications for Android," Oct. 2008, Version 1.0, 1-28 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1308842.2, Applicant: Box, Inc. Mailed Mar. 10, 2014, 4 pages.
Exam Report for GB1312264.3, Applicant: Box, Inc. Mailed Mar. 24, 2014, 7 pages.
Exam Report for GB1314771.5, Applicant: Box, Inc. Mailed Feb. 17, 2014, 7 pages.
Exam Report for GB1318792.7, Applicant: Box, Inc. Mailed May 22, 2014, 2 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc. Mailed Feb. 7, 2014, 9 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1410569.6 Applicant: Box, Inc. Mailed Jul. 11, 2014, 9 pages.
Sommerer, "Presentable Document Format: Improved On-demand PDF to HTML Conversion," retrieved from the internet, http://research.microsoft.com, Nov. 2004, 8 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.

\* cited by examiner

SYSTEMS AND METHODS FOR SECURE FILE PORTABILITY BETWEEN MOBILE APPLICATIONS ON A MOBILE DEVICE

CROSS-REFERENCE TO RELATED APPLICATION

The present application claims priority to and benefit from U.S. Provisional Patent Application Ser. No. 61/697,437 titled "Secure File Portability Between Mobile Applications Using A Server-based Key Generation Service", filed on Sep. 6, 2012, the content of which is incorporated by reference herein. This application also claims priority to and benefit from U.S. Provisional Patent Application Ser. No. 61/650,840 titled "PLATFORM AND APPLICATION AGNOSTIC METHOD FOR FILE ACCESS IN A MOBILE ENVIROMENT".

The present application is related to co-pending U.S. patent application Ser. No. 13/776,535 titled "System and Method for Creating a Secure Channel for Inter-Application Communication Based on Intents", filed on Feb. 25, 2013, the content of which is incorporated by reference herein.

BACKGROUND

The Android operating system ("Android OS") relies on a rich inter-application messaging system called "Intents" for communication between applications. The messaging system promotes collaboration between applications by allowing applications to leverage existing data or services from each other. For example, a restaurant directory application can ask one application to launch the a restaurant website, another application to call a restaurant, another application to display directions to a restaurant, and so on.

The Intents based messaging system can pass data between applications. However, the default mechanisms for passing data between the application are generally insecure. The default mechanisms expose the data to not just the applications involved in the passing of the data but also to any other applications on the mobile device.

DETAILED DESCRIPTION

Figure 1:
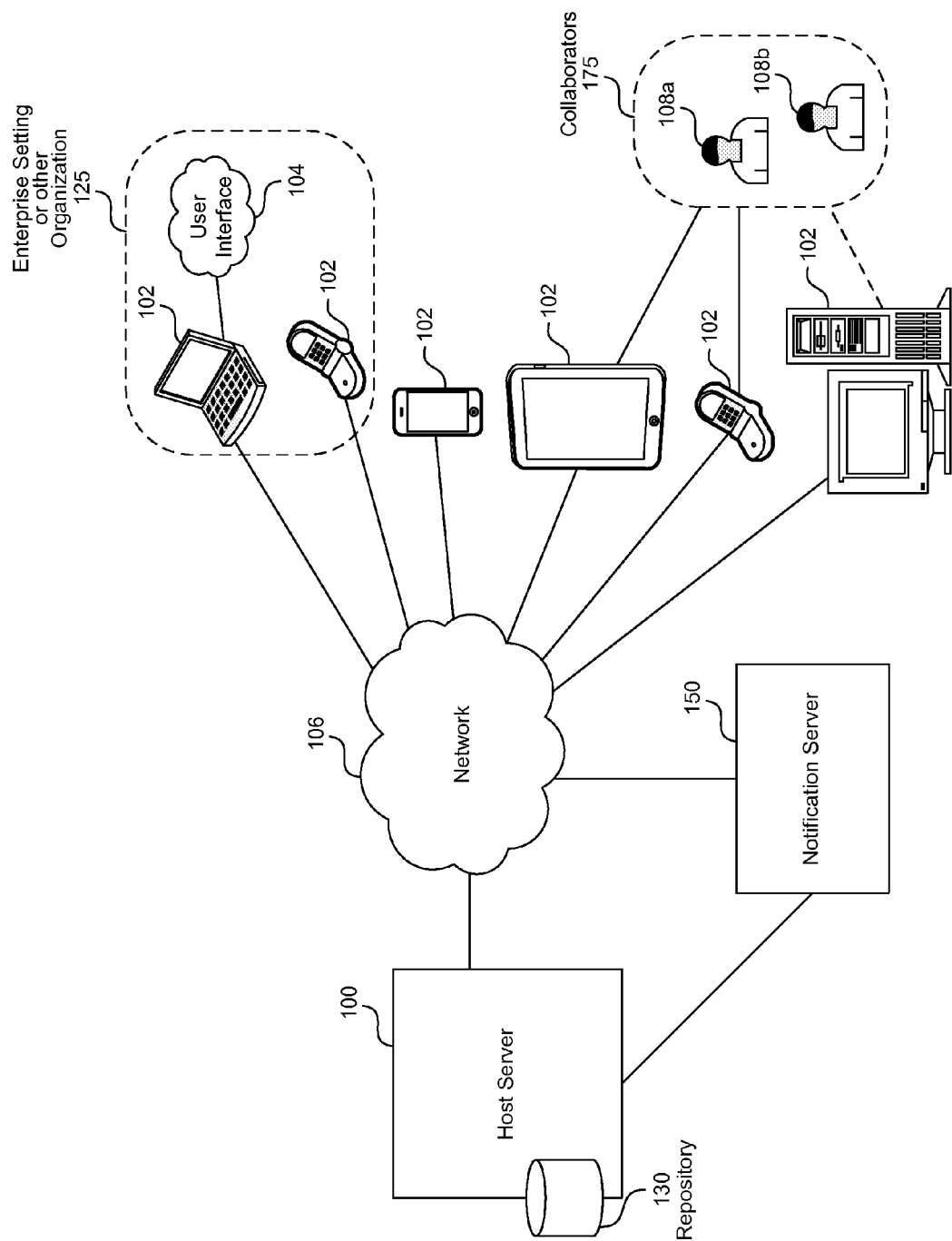
FIG. 1 illustrates an example diagram of a system having a host server of a cloud service and/or cloud storage accounts accessible via a mobile application allowing secure file portability with another mobile application.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for secure file portability between mobile applications accessed via a mobile device. In one embodiment, secure file portability between mobile applications is supported by a server-based key generation service.

When a mobile operating system passes data between applications running on its platform, the default mechanism is usually insecure and exposes the data openly to any application on the system, not just the ones involved in the passing of the data. In one embodiment, the disclosed systems and methods include having a mobile application or client on the device make requests to one or more host servers (e.g., servers enabling or providing cloud services, cloud-based storage, collaboration and/or file sharing services) for individual encryption keys to be used for each transaction involving a file transfer (hereinafter "transaction"). The keys are used to encrypt packages of data before they leave the mobile application so that they are unreadable in transit. Because the keys are unique per transaction, even if one transaction is compromised, the risk does not spread to subsequent transactions.

In one embodiment, the host servers can be, for example, equipped to generate many keys for use in transactions, and the platform application programming interfaces (APIs) are augmented to provide methods to retrieve these keys on a per-transaction basis. While a server-side-only component implementation provides additional security over client-side-only solutions, in some instances, a combination of server and client side solutions can be implemented and is considered within the scope of the innovation. The uniqueness of the keys per transaction, even though there are potentially thousands of them that occur per hour, can be critical to ensuring the safety of data each time it is accessed from the system (e.g., any cloud-environment, cloud service, or cloud-based collaboration environment).

As a file is transferred between mobile applications installed on a mobile device, the file receiving mobile application (hereinafter "receiving application") becomes the active application (or comes to the foreground), while the file sending mobile application (hereinafter "sending application"). stays in the background. In one implementation, the sending application can include a mobile application for accessing servers providing cloud services, cloud-based storage, collaboration and/or file sharing services. In a further implementation, the sending application can include mobile applications that transfer or export files or other data to another mobile application, where the files or other data are viewed, modified, processed or manipulated. In one implementation, the receiving application can include any mobile application for viewing, modifying, processing or manipulating files or other data obtained from the sending application. For example, a user may have a "Box" mobile application and a "QuickOffice" mobile application installed on his or her mobile device. In one implementation, "Box" can be a sending application providing the user access to files stored locally in Box or remotely in Box servers. "QuickOffice" can be a receiving application that allows the user to edit files (e.g., Word, Excel, PowerPoint and other documents). The user can thus open a Word document from "Box" (i.e., the sending application) in "QuickOffice" (i.e., the receiving application), edit the Word document in "QuickOffice", and save the edited Word document in "Box" (locally in Box or remotely in Box servers).

The sending application can be running even when it is not being actively used by a user. The operating system (OS), however, can terminate the sending application when there is not enough memory or the sending application can simply crash. When the sending application crashes or is terminated, the user can be logged out of the application, and the receiving application may not be able to upload the file back to the sending application. By way of an example, the situation may also arise when the application is configured to log the user out whenever the application is not active. Mobile devices usually allow users to toggle between applications, but cannot make two applications visible at the same time. If the user tries to log back in by switching to the sending application, the user incurs the risk of the receiving application getting terminated or killed by the OS.

In one embodiment, the disclosed systems and methods can support file portability between mobile applications by running a background service that keeps in contact with the host servers to keep the user logged in to the sending application, even when it is not the active application. By re-validating the user session, any files from the receiving application can be safely transferred back into the sending application. In one implementation, the background service detects the log out event or expiration of the auth token (or authentication token) and presents a minimal user interface for the user to input login credentials such as a username, email address, password, pin code, gesture, and/or the like, without having to exit out of the receiving application user interface. The background service sends a request to the remote servers to obtain a new auth token to log the user back in, and allow transfer of files into the sending application.

Various aspects of the cloud-based platform and the systems and methods for secure file portability between mobile applications will now be described. In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

FIG. 1 illustrates an example diagram of a system having a host server of a cloud service and/or cloud storage accounts accessible via a mobile application allowing secure file portability with another mobile application.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
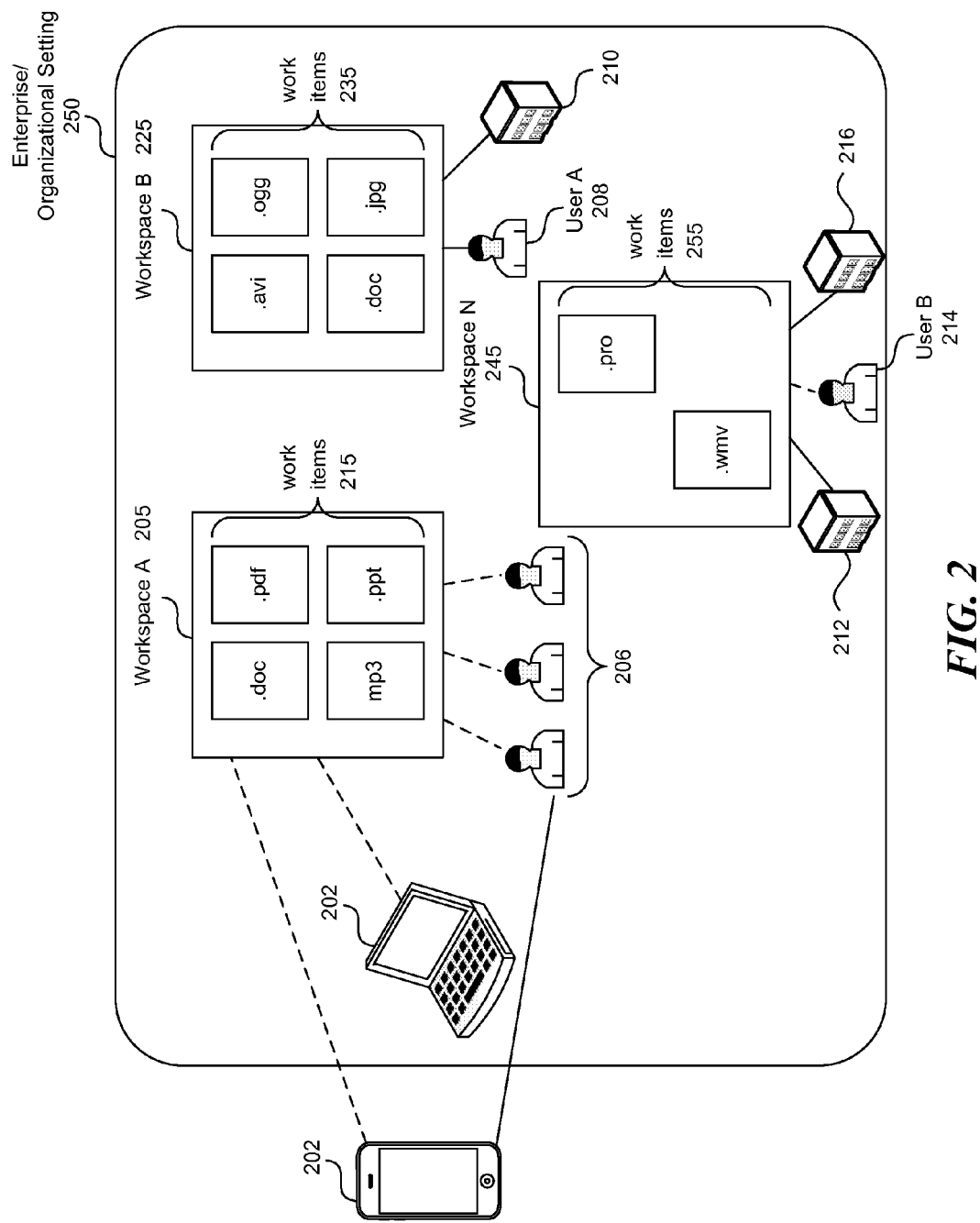
FIG. 2 depicts a diagram of a web-based or online collaboration platform deployed in an enterprise or other organizational setting for organizing work items and workspaces, as one example of a hosted cloud service and/or cloud storage accounts accessible via a mobile application allowing secure file portability with another mobile application.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, the host server 100 of cloud-based services and/or cloud storage such as an online or web-based collaboration environment is able to track or monitor the devices used by users to access content or activities. In one implementation, such tracking or monitoring may be performed upon receiving explicit permission or authorization from users.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts a diagram of a web-based or online collaboration platform deployed in an enterprise or other organizational setting 250 for organizing work items 215, 235, 255 and workspaces 205, 225, 245, as one example of a hosted cloud file sharing, collaboration service and/or cloud storage service accessible via a mobile application allowing secure file portability with another mobile application.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A-N) may be created to support different projects or a variety of work flows. Each workspace may have its own associate work items. For example, work space A 205 may be associated with work items 215, work space B 225 may be associated with work items 235, and work space N may be associated with work items 255. The work items 215, 235, and 255 may be unique to each work space but need not be. For example, a particular word document may be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 may be associated with departments 212 and 216 and users shown as example user B 214.

Each user associated with a work space may generally access the work items associated with the work space. The level of access may depend on permissions associated with the specific work space, and/or with a specific work item. Permissions may be set for the work space or set individually on a per work item basis. For example, the creator of a work space (e.g., one of user A 208 who creates work space B) may set one permission setting applicable to all work items 235 for other associated users and/or users associated with the affiliate department 210, for example. Creator user A 208 may also set different permission settings for each work item, which may be the same for different users, or varying for different users.

In each work space A, B, . . . , N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
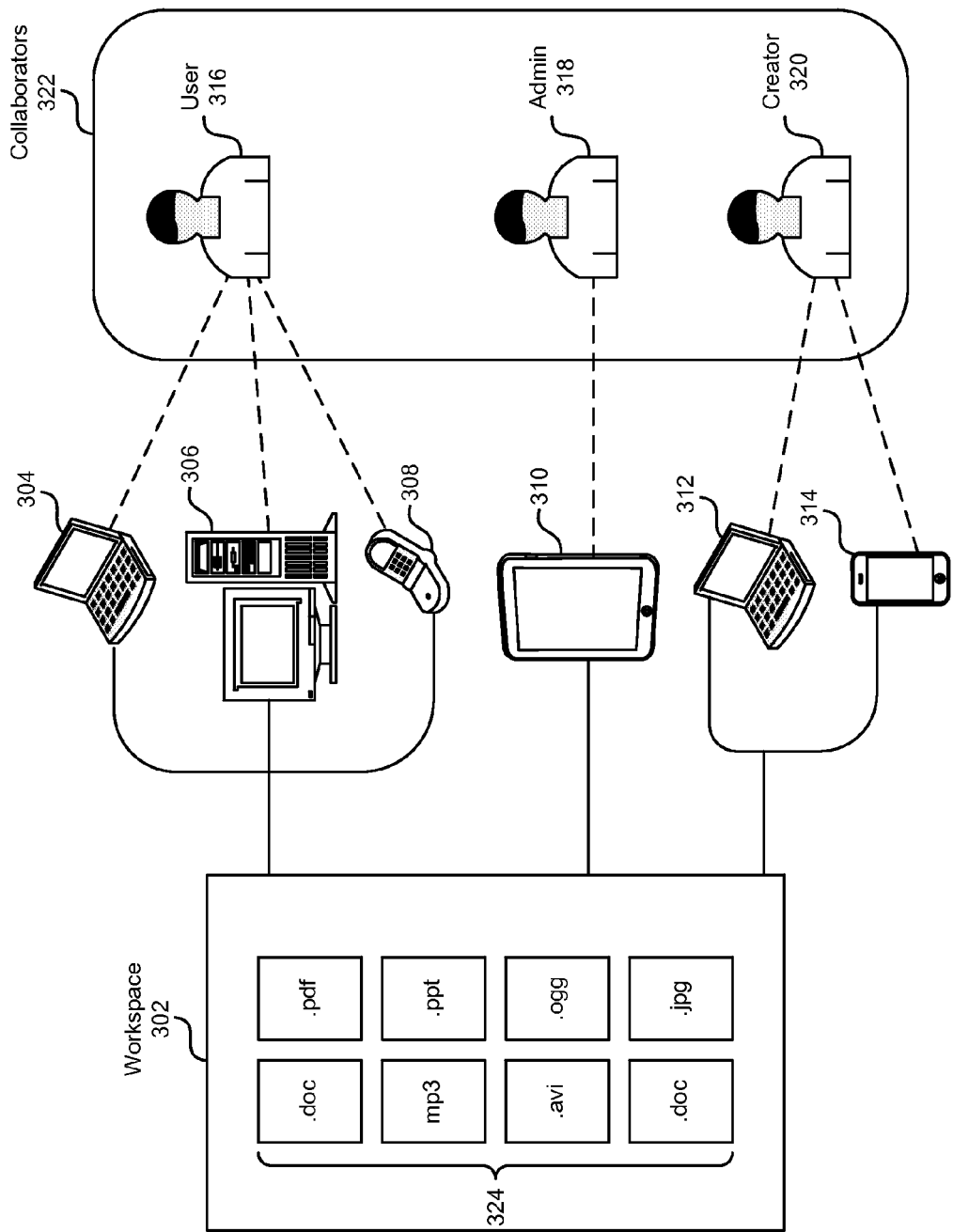
FIG. 3 depicts an example diagram of a workspace in a cloud-based, online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices authorized to access the work space.

Each of users 316, 318, and 320 may individually use multiple different devices to access and/or manipulate work items 324 in the work space 302 with which they are associated with. For example users 316, 318, 320 may be collaborators on a project to which work items 324 are relevant. Since the work items 324 are hosted by the collaboration environment (e.g., a cloud-based environment), each user may access the work items 324 anytime, and from any physical location using any device (e.g., including devices they own or any shared/public/loaner device).

Work items to be edited or viewed may be accessed from the workspace 302 in accordance with the platform and/or application independent mechanisms. Users may also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Figure 4:
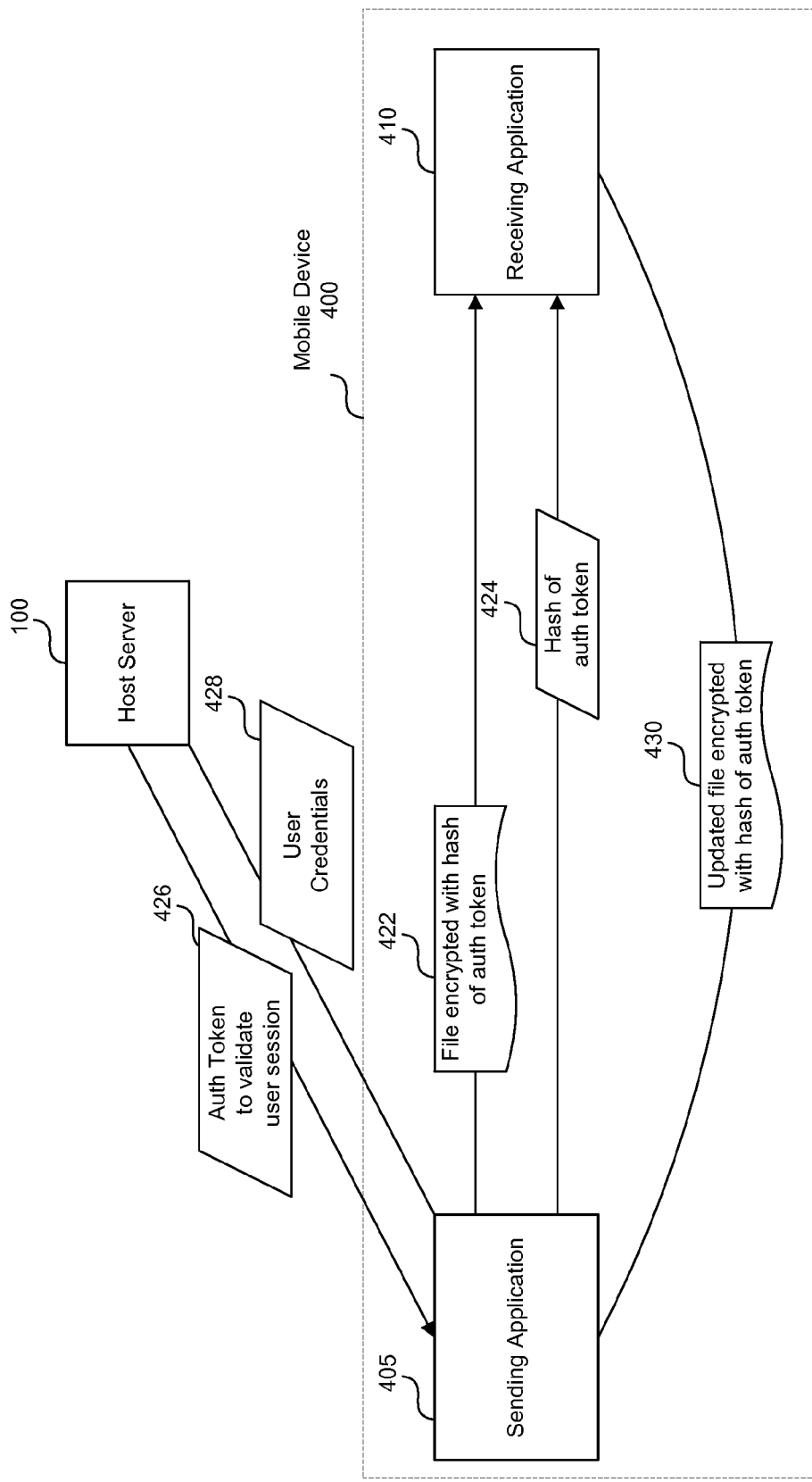
FIG. 4 depicts a block diagram illustrating an example data flow between a host server and mobile applications in a cloud-based environment or cloud-based collaboration and file sharing environment for secure file portability between the mobile applications using a user session revalidation background service.

FIG. 4 depicts a block diagram illustrating an example data flow between a host server and mobile applications in a cloud-based environment or cloud-based collaboration and file sharing environment for providing secure file portability between the mobile applications using a user session revalidation background service.

In one embodiment, a mobile device 400, which can be any of the client devices 102, includes a sending application 405 and a receiving application 410. The sending application 405 can be associated with the host server 100 and can be in communication with the host server 100. The sending application 405 includes a background service that requests an auth token from the host server 100 by providing the user credentials 428 input by the user. The user credentials can include a username, email address, password, pin code, gesture, and/or the like that are associated with the user and the sending application 405. In response to the request, the host server 100 sends the sending application 405 an auth token 425 to validate/re-validate the user session with the sending application 405.

The sending application 405, when instructed by a user, can send a user-selected file or files to a receiving application 410. The sending application 405 can rely on the operating system (OS) or mobile platform communication mechanism such as the Intents in the Android platform to broadcast a request to open a file in a receiving application. By using custom Intents, only sanctioned or authorized receiving applications that are qualified to interact with the sending application or participate in transactions with the sending application can be detected. Once a receiving application 410 is selected, a secure channel between the sending application 405 and the receiving application 410 can be opened to allow passage of encrypted file 422 to the receiving application 410, where the file can be decrypted and viewed, edited, or manipulated in various ways. Further details regarding the secure channel can be found in co-pending US application entitled "System and Method for Creating a Secure Channel for Inter-Application Communication Based on Intents," which is hereby incorporated by reference in its entirety.

In one implementation, the encrypted file 422 can be encrypted using a key that is a hash of the auth token 426. In an alternate implementation, the auth token can be hashed together with a time stamp. Any appropriate hash function such as MD5, SHA-1/2/3, and the like can be used to generate the hash. In one implementation, advanced encryption standard (AES) with a key size of 128, 192 or 256 bits can be used to encrypt the data file before it is sent to the receiving application 410. In one implementation, the key (e.g., hash of auth token) 424 can be communicated to the receiving application 410. The key is a shared (secret) key that can be used to encrypt and decrypt the file being transferred.

Once the file is received and decrypted, the receiving application 410 can display the file and allow the user to perform the desired manipulations. The receiving application becomes the "active" application, and the sending application becomes the "inactive" application. The inactive application can run on the background of the OS, but can be terminated by the OS when there are too many processes running and/or when the memory is limited. Once the user has made the desired changes or processed the file in the receiving application 410, the file can be uploaded back to the sending application 405, via the same channel or a new channel. The background service that obtains the auth token 426 to re-validate user session whenever the user is logged out of the sending application 405 (e.g., due to application crashing, application being terminated by OS for memory management, application having an auto log out setting, and the like) allows the receiving application 410 to upload the file back to the sending application. As before, the updated file 430 can be encrypted and sent as a data stream to the sending application 405. In one implementation, the encryption of the updated file 430 may be using the same key that was used to decrypt the file. In an alternate implementation, the updated file 430 can be encrypted using a hash of the new auth token if the user session was re-validated following the file transfer to the receiving application.

Figure 5:
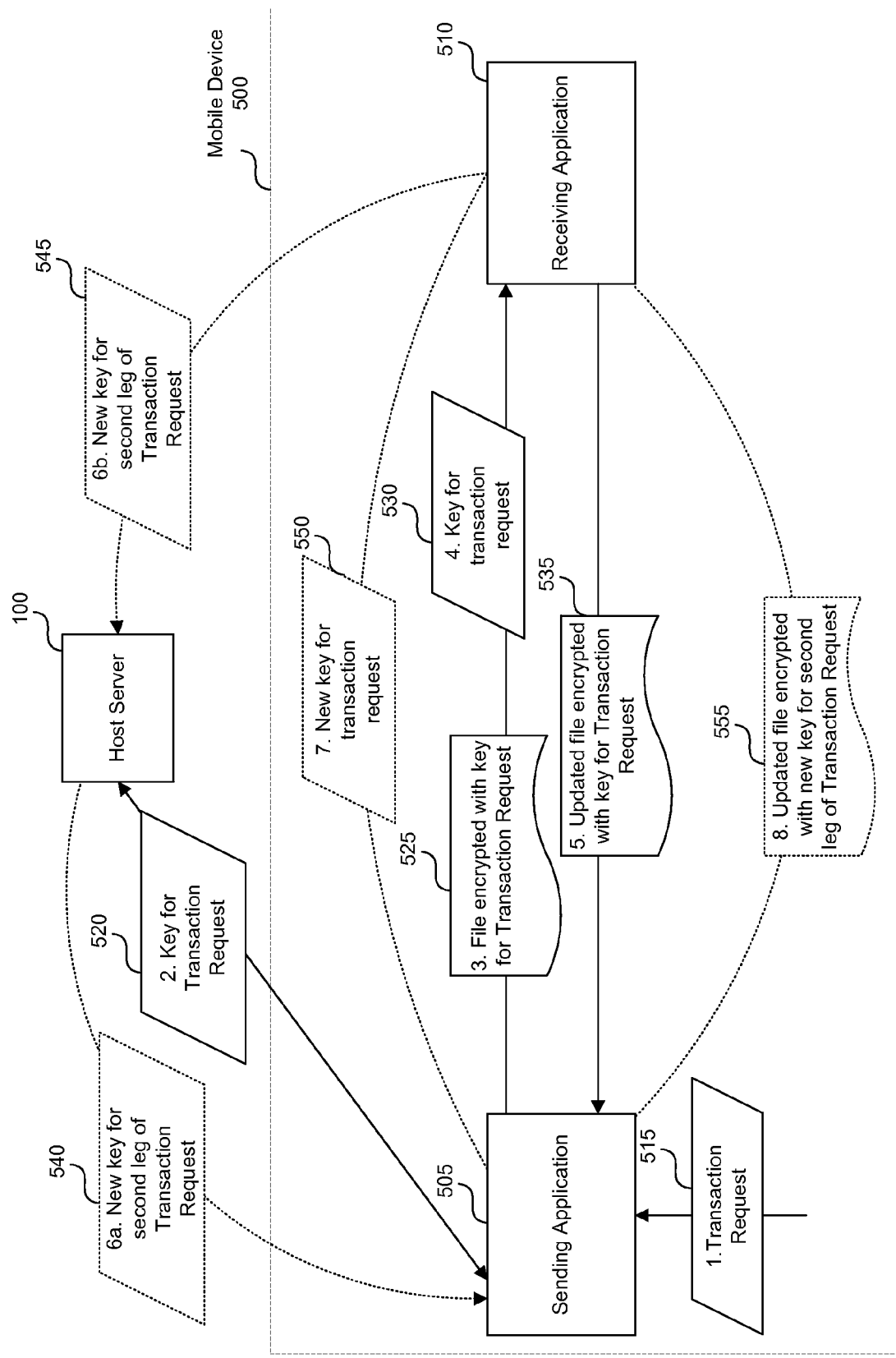
FIG. 5 depicts a block diagram illustrating an example data flow between a host server and mobile applications in a cloud-based environment or cloud-based collaboration and file sharing environment for providing secure file portability between the mobile applications using a server-based key generation service.

FIG. 5 depicts a block diagram illustrating an example data flow between a host server and mobile applications in a cloud-based environment or cloud-based collaboration and file sharing environment for providing secure file portability between mobile applications using a server-based key generation service.

In one embodiment, a mobile device 500, which can be any of the client devices 102, includes a sending application 505 and a receiving application 510. In one implementation, a user using his or her mobile device 500 sends a transaction request message 515 from the sending application 505. In one implementation, the sending application 505 is associated with the host server 100 and thus communicates with the host server 100 to obtain a key 520 for the transaction request 515. The key can be used to encrypt one or more files associated with the transaction request. In one implementation, an encryption key can be derived from the key 520 obtained from the host server 100. For example, when the key 520 is an auth token, a hash of the auth token or hash of the auth token and time stamp can be determined, and the hash can be used as an encryption key.

A file 525 associated with the transaction request and encrypted with the key 520 is passed to the receiving application 510 via a secure channel. The key 530 for the transaction request 515 that the receiving application would need to decrypt the file is also passed to the receiving application 510. The receiving application 510 can decrypt the file using the key 530 and open the file for editing by the user. In one implementation, the edited or updated file 535 is encrypted using the same key 530 and then passed back to the sending application 505 over the same secure channel or a new secure channel. Alternately, the sending application 505 can obtain a new key 540 from the host server 100 and pass the new key or a hash of the new key 550 to the receiving application 510. The receiving application 510 can use the new key to encrypt the updated file, and the updated file 555 is passed back to the sending application. In yet another implementation, the receiving application 510 can obtain a new key 545 for the second leg of the transaction request directly from the host server (e.g., by making an API call) and use the new key 545 to encrypt the updated file.

Figure 6:
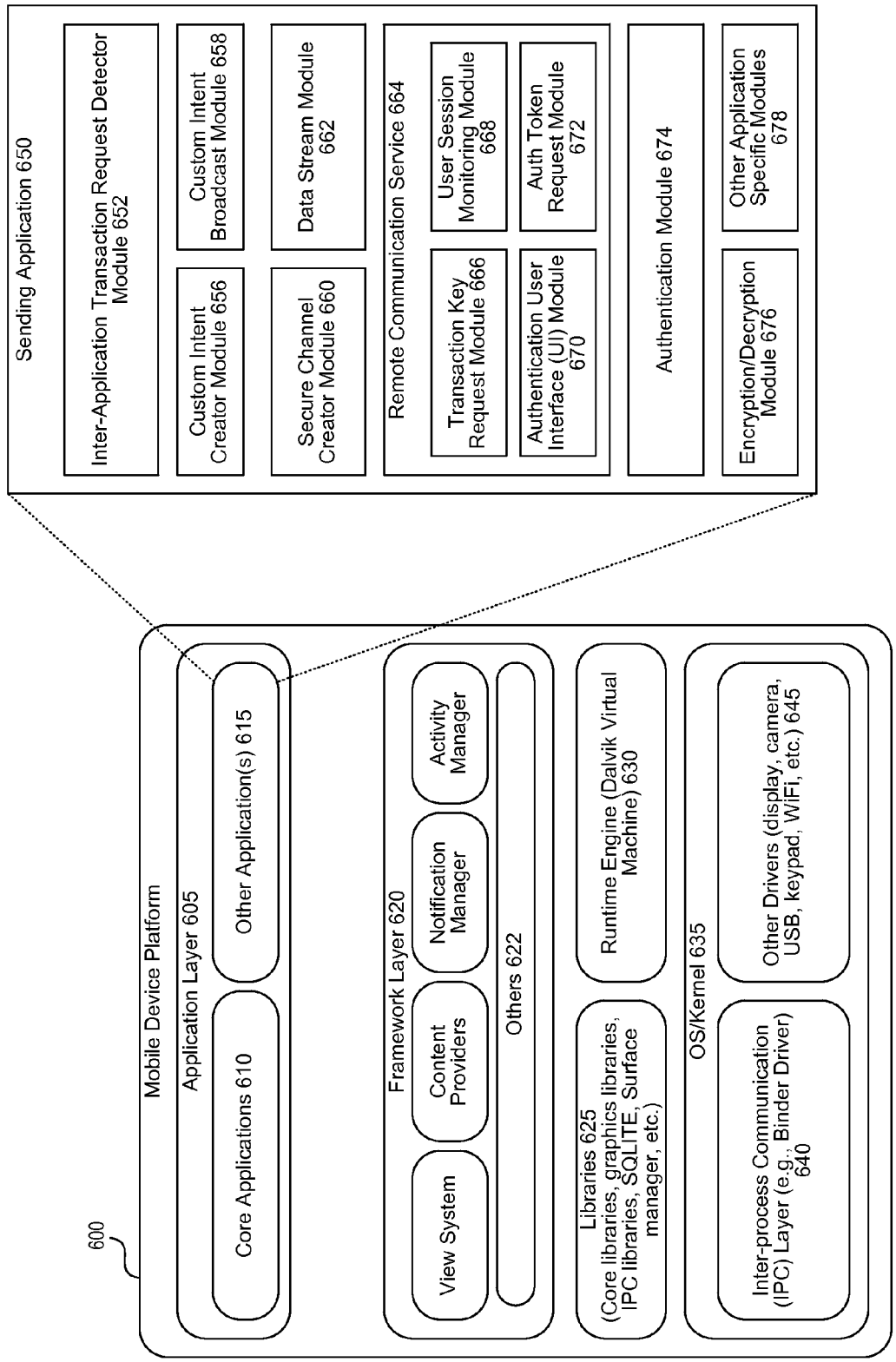
FIG. 6 depicts a block diagram illustrating example components of a mobile device platform (e.g., the Android platform) and example components in a sending application on the mobile device platform.

FIG. 6 depicts a block diagram illustrating example components of a mobile device platform (e.g., the Android platform) and example components in a sending application on the mobile device platform. In one implementation, the sending application 650 provides access to the host server 100 for cloud-based services (e.g., collaborative and/or file sharing) and storage services.

The mobile device platform 600 can include an application layer 605, a framework layer 620, libraries 625, runtime engine 630 and a kernel 635. The application layer 605 includes native or core applications 610 and other applications 615 which can include, for example, the cloud-based collaboration platform application, white-listed applications, unauthorized or malicious application, and the like. The core applications 610 includes a set of applications such as email, SMS, calendar, maps, browsers, camera, alarm, media player, clock, voice dial, contacts, calculator, and the like.

The framework layer 620 includes framework application programming interfaces (APIs) that are used by the core applications, but can also be used by other applications 615 to take advantage of the mobile device hardware, access location information, store data in internal or external storage on the mobile device, run background services, add notifications (e.g., to the status bar), and the like. All applications are supported by a set of services and systems. For example, the view system can be used to build application user interface elements such as lists, text boxes, buttons, and the like. Content providers allow applications to access data from other applications or share their own data. A resource manager provides access to non-code resources such as localized strings, graphics, and layout files. A notification manager enables applications to display custom alerts in the status bar. An activity manager manages the lifecycle of applications and provides common navigation elements. The framework layer 620 may include additional components 622 that have not been specifically described.

A set of core and other libraries 625 are used by various components of the mobile device platform and provides many of the functionality. Example core libraries include media libraries that support playback and recording of audio/video and images, surface manager that manages access to the display subsystem and seamlessly compounds 2D and 3D graphic layers from multiple applications, a web browser engine that powers browsers and an embeddable web view (e.g., LibWebCore), 3D libraries (e.g., OpenGL ES 1.0 APIs), libraries for bitmap and vector font rendering, SQLite which is a powerful and lightweight relational database engine available to all applications, system C library, and the like.

Each mobile application can run in its own process with its own instance of the Virtual Machine 630 such as the Dalvik VM. The Dalvik VM, for example, executes files in the Dalvik Executable (.dex) format which is optimized for minimal memory footprint. The OS or the kernel 635 is the Linux kernel that acts as an abstraction layer between the hardware and the rest of the stack including the application layer 605, the framework layer 620, the libraries 625 and the virtual machine 630. The kernel supports core system services such as memory and process management, network stack, driver model and security. The kernel includes drivers 645 for display, camera, USB, keypad, Wi-Fi, and the like, and an inter-process communication (IPC) layer 640 that includes a binder driver to provide an IPC mechanism to facilitate communication (e.g., exchange of data) between processes within an application (intra-application communication) and between applications (inter-application communication). The IPC mechanism includes the Intent mechanism, using which the IPC layer 640 sends Intents to communicate data. The IPC layer, via the Intent mechanism, can start an activity, bring another activity to the front, start or stop a service, query and obtain results from a content provider (e.g., a data storehouse), deliver Intents to broadcast receivers, and the like.

The other applications 615 can include one or more user-installed sending and receiving applications, including the sending application 650. In one implementation, the sending application 650 can include example components such as an inter-application transaction request detector module 652, a custom Intent module 654, a secure channel creator module 660, a data stream module 662, a remote communication service 664, an authentication module 674, an encryption/decryption module 676 and other application specific modules 678. The application specific modules 678 include components such as, but not limited to: a user interface module, application logic engines, upload/download managers, notification engines, and the like that perform the various functions of the sending application.

The inter-application transaction request detector module 652 detects transaction requests initiated by a user of the mobile device. For example, a user can select a document from a user interface of the sending application 650 to open the document in another mobile application (i.e., receiving application). The user request to open the document can be detected and identified as an inter-application transaction request by the detector module 652. The detector module 652 can then notify or kick off the custom Intent module 654.

The custom Intent module 654 can include the custom Intent creator module 656 and the custom Intent broadcast module 658. The custom Intent creator module 656 can create a custom Intent to identify a receiving application and request the receiving application to perform a specific action. In some implementations, the custom Intent can include data or other extras. A custom action is different from other general actions such as ACTION_VIEW, ACTION_EDIT, ACTION_MAIN, etc., that are defined in the Android API and thus can be understood by all applications. A custom action, on the other hand, can be understood by those applications that recognize the request and know how to respond to the request. The custom Intent from the custom Intent creator module 656 can request a receiving application to perform custom actions, including, but not limited to: modify an existing file, create a new file, upload the new file, open and show contents of a file, launch application, and the like.

The custom Intent broadcast module 658 can broadcast the created Intent to all applications, including white-listed and unauthorized applications. The broadcasting may be achieved by using the broadcast method provided by the Android API.

The secure channel creator module 660 can create a secure channel between the sending application 650 and a receiving application. The secure channel creator module 660 can allocate an area on the device's storage as a staging area for data to be passed between the sending and receiving applications. The storage area can be an internal storage area that can be accessed by both sending and receiving applications. Alternately, the storage area can be an external storage area such as an SD card. The storage area is effectively the channel between the applications. The channel is secure since only the sending and receiving applications have access to it. Furthermore, the files that go into the storage area are securely encrypted, providing an added layer of security. Files that are passed between applications may be sent as whole files or as data stream to obfuscate the inter-application communication. The data stream module 662 includes methods for opening input and output streams to read and write data. The data stream module 662 can also automatically encrypt the data streams for passage through the secure channel between the sending and receiving applications. The data stream module, in one implementation, can leverage the encryption/decryption module 676 to encrypt (or decrypt) data stream using various encryption methods. In one implementation, advanced encryption standard (AES) with a key size of 128, 192 or 256 bits can be used to encrypt the data stream. Alternately, any other symmetric or asymmetric encryption/decryption methods can be implemented in other embodiments.

The remote communication service 664 is an application component including instructions/code that can run in the background as its own process. In other words, a new thread can be created within the remote communication service 664 to do the operations of the service. As the service runs in a thread that is separate from the sending application's main thread, if the sending application is terminated, the service can continue to run in the background. The remote communication service 664, in other words, can run in the background even when a user is not directly interacting with the application. The remote communication service 664 may have a small memory footprint to ensure that the service itself is not terminated by the OS for memory recovery. In one implementation, the remote communication service 664 can be made high priority, such that the OS, in the event of intense memory pressure, can terminate other, low priority processes before the remote communication service 664.

The remote communication service 664 provides secure file portability between the sending application and a receiving application. One embodiment of the remote communication service 664 can include a transaction key request module 666, a user session monitoring module 668, an authentication user interface (UI) module 670 and an auth token request module 672. Implementation of one or more of these modules may be optional in some embodiments. In some embodiments, one or more of these modules may be configured to run in the sending application's main thread instead of the thread created within the service. For example, the transaction key request module 666 may be implemented on the application's main thread. In a further implementation, instead of being implemented as a service, the transaction key request module 666 can be implemented as a process.

In one embodiment, the transaction key request module 666 maintains or establishes a connection with the host server 100 (or another server generating or providing keys for the sending application transactions). When a transaction request is detected (e.g., by the inter-application transaction request detector module 652), the transaction key request module 666 can request a key from the host server. The key obtained from the host server can be unique for each transaction request. The key obtained by the transaction key request module 666 can be provided to the encryption/decryption module 676 to encrypt files associated with the transaction request, and not any other transactions, for passage via the secure channel to a receiving application. Each transaction request can be identified by a transaction ID and/or any other information relating to the transaction request such as the user ID, file name(s), file ID, time of transfer, receiving application ID, and the like.

Alternately, the transaction key request module 666 can be configured to request a key for a transaction request only under certain conditions. For example, in one implementation, if a second transaction occurs within one hour (or any other time period) of a first transaction, the key obtained for the first transaction can be used for the second transaction and any other subsequent transactions occurring within the predefined time period. In one implementation, the number of transaction requests or file items to which the key can be applied to may be limited. In another implementation, the transaction key request module 666 can be configured to request a key for one or more transactions with a specific receiving application. For example, if the sending application performs a first transaction with a receiving application "A," a second transaction with a receiving application "B" and third and fourth transactions with the receiving application "A", the key requested for the first transaction with receiving application "A" can be applied to the third and fourth transactions with the same receiving application. In a further implementation, the number of transaction requests or file items associated with transactions with a specific receiving application to which the key can be applied to may be limited.

In one implementation of the transaction key request module 666, the key obtained from the host server can include a token (e.g., an auth token) and a time stamp. The key request module 666 or the encryption/decryption module 676 can hash the token, time stamp and/or other information and use the hash value as the key for encryption. Any appropriate hash function such as MD5, SHA-1/2/3, and the like can be used to generate the hash value.

One implementation of the transaction key request module 666 can also pass the key obtained (or generated) to a receiving application associated with the transaction request. The passing of the key may be via the secure channel or via an alternate mechanism (e.g., explicit Intent), for example.

File portability between mobile applications can be affected when a user is logged out of the sending application, and the file exported to the receiving application for editing or other manipulation cannot be uploaded back to the sending application because of the user being logged out. In one embodiment, the user session monitoring module 668 can monitor the user session with the sending application. In one implementation, the user session monitoring module can detect when the sending application's process is terminated for various reasons including user setting (e.g., log out when the application is not active) and low memory, or when the auth token for the sending application is expired (e.g., based on time stamp for the auth token or based on error code when auth token is used).

When the end of the user session is detected, the authentication user interface (UI) module 670 can generate and/or present a minimal UI to the user to obtain the user's credentials. The authentication UI can have one or more fields for the user to enter login credentials such as a username/password, a pin code, a gesture, and the like. Alternately, other authentication techniques, such as fingerprinting, retina scan, facial recognition, voice recognition, and the like, can also be used to identify the user. The UI that is presented is not a part of the sending application user interface, and as such, the user does not need to switch from the current application (i.e., the receiving application) to the sending application to log in. After the submission of the user credentials via the UI, the user is returned to the user interface where he or she was before the authentication UI was presented.

The user credentials input by the user can be packaged into an authentication token request message by the authentication token request module 672 and sent to the host server. The host server can receive and parse the request message and authenticate the user by comparing the user credentials against a repository. If the user credentials are correct, the host server can generate and send an auth token that is received by the auth token request module 672. The authentication module 674 can then use the auth token to revalidate the user session with the sending application. The sending application can then receive any files sent by a receiving application.

Figure 7:
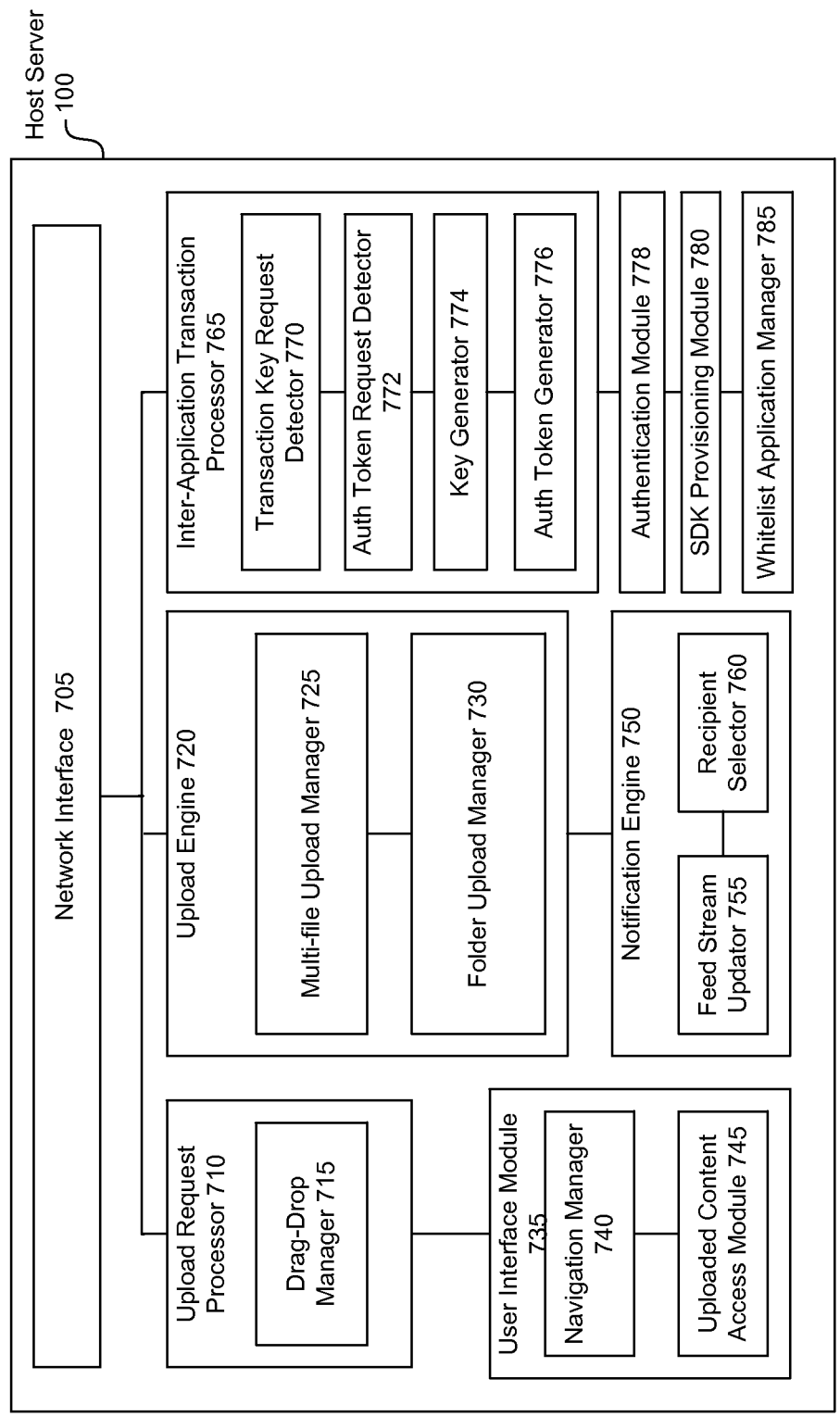
FIG. 7 depicts a block diagram illustrating an example of components in a host server for cloud-based services (e.g., collaborative and/or file sharing) and storage services accessible via a sending application.

FIG. 7 depicts a block diagram illustrating an example of components in a host server for cloud-based services (e.g., collaborative and/or file sharing) and storage services accessible via a sending application.

The host server 100 of the web-based or online collaboration environment can generally be a cloud-based service. The host server 100 can include, for example, a network interface 705, an upload request processor 710 having a drag-drop manager 715, an upload engine 720 having a multi-file upload manager 725 and/or a folder upload manager 730 and a user interface module 735 having a navigation manager 740 and an upload content access module 745. The host server 100 can also include, for example, an inter-application transaction processor 765 having a transaction key request detector 770 and a key generator 774, and/or an auth token request detector 772 and an auth token generator 776. One embodiment of the host server 100 can also include an authentication module 778, an SDK provisioning module 780 and a white list manager 785. Another embodiment of the host server 100 further includes a notification engine 750 having, for example, a feed stream updator 755 and/or a recipient selector 760. Additional or less components/modules/engines can be included in the host server 100 and each illustrated component.

The network interface 705 can be a networking module that enables the host server 100 to mediate data in a network with an entity that is external to the host server 100, through any known and/or convenient communications protocol supported by the host and the external entity. The network interface 705 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

One embodiment of the host server 100 includes the upload request processor 710 which can receive, detect, process, identify, parse, translate, and/or determine an activity request. An upload request can be submitted by a user through a user interface of the collaboration platform to upload one or multiple items.

The user can identify the files, content, or work items to be uploaded to the host server 100 one-by-one and queue up multiple items (e.g., including but not limited to files, folders, documents, images, audio, etc.) to be uploaded in a single request. The user can also select all of the items to be uploaded in a single action (e.g., via highlighting or otherwise selecting of icons corresponding to each of the items). In one embodiment, the upload request is generated via a drag-and-drop action of the multiple work items to be uploaded to the host server into a portion of a user interface. Drag-and-drop activated uploaded requests can be detected, handled, received, processed, and/or otherwise managed by the drag-drop manager 715.

In one embodiment, the upload request is generated via a drag-and-drop action of a single folder which includes the multiple work items to be uploaded to the host server 100. For example, the upload request can be generated when a folder having the multiple items on a client device that is to be uploaded is identified through the user interface. In some instances, the folder can include additional folders in a folder hierarchy of multiple items.

In some instances, the user can generate an upload request by activating the upload feature in a tab on a user interface and initiate uploading by selecting (e.g., clicking on or otherwise activating) a button/tab. Once selected, another user interface or a pop-up window may appear allowing the user to navigate through files or folders to select the items to be uploaded.

Once upload requests have been detected and processed, the upload engine 720 can upload the requested item or multiple requested items. The upload engine 720 can, in one embodiment, upload a single item or multiple items (e.g., sequentially or simultaneously) to the host server 100. A multiple item upload may be initiated via a single-step or multi-step user request. A multi-file upload request can be handled, processed, and executed, for example, through the multi-file upload manager 725.

In one embodiment, the multi-file upload manager 725 receives an identification of each of the multiple files to be uploaded (e.g., from the upload request processor 710) and sequentially prepares each individual file for uploading and uploads each file independently. For example, the upload manager 725 can compress one of the multiple files individually, upload it to the host server 100 and decompress the file when uploaded and proceed to perform the same steps with the next file. Preprocessing a file can include, for example, analyzing the file size and type to determine if it is acceptable/valid and/or to identify how best to compress the file. Post-processing can include, for example, performing one or more of, decompressing the file, validating the file size and name, checking permissions, potentially scanning for malicious software, and/or moving to permanent storage. The step of moving to storage can further include, one or more of, adding the file metadata to the database, creating thumbnails, creating previews, indexing for search, encrypting the file, and/or storing in multiple locations for redundancy. Note that the above processes can occur in any order or synchronously in any combination with one another. The process continues until all items in the request have been uploaded to the host server 100. The upload may automatically progress from one file when completed to the next one in sequence when the user initiates a multi-file upload request.

In one embodiment, the upload engine 720 uploads multiple items in a folder hierarchy based on a single request to upload a folder which has a hierarchy of folders inside, for example, via the folder upload manager 730. In one embodiment, the folder upload manager compresses the multiple items in the folder hierarchy in a single process into a single item and uploads the single item in a single upload process (rather than one by one) to the host server 100. After the merged file of multiple items has been uploaded, the folder upload manager 730 can decompress and subsequently parse the single upload of the single item into the original individual files that were stored as multiple items in the folders in the hierarchy. By merging multiple files into one and performing a single compression, and decompression step, the uploading process can be expedited since the overhead in time to compress and decompress multiple files is mostly eliminated. Some additional benefits of bulk uploading allow the following overhead to be partially or wholly eliminated: repeatedly creating TCP connections for each upload, repeatedly checking the same permissions and storage quotas when processing the files on the server.

One embodiment of the host server 100 includes a notification engine 750. The notification engine 750, can for example, update a feed stream to include an updated feed indicate that an item or multiple items have been uploaded, for example, via the feed stream updator 755. The users that are notified can be selected, for example, by the recipient selector 760, and can include collaborators or the user, or other users meeting a criterion. In some instances, the feed stream is updated in real time or near real time relative to when the upload of the item completed. For real-time updating, the notification engine 750 can utilize another server, or another engine in the same server which provides push functionality.

The notification engine 750 can generally notify users, which can be collaborators of the user who performed the activity in the work space via one or more of many mechanisms, including but not limited to, email, SMS, voice-message, text-based message, RSS, feed, etc., as described in detail with further reference to related co-pending U.S. patent application Ser. No. 13/152,982 filed on Jun. 3, 2011. The contents of which are incorporated herein by reference in its entirety.

In one embodiment, the notification is depicted through a web-browser used by the other user to access the web-based collaboration environment, for access in real time or near real time to when the activity was performed by the user. When notifying a user in real time through a web-browser, the notification engine 750 can utilize a push-enabled service to ensure real time notification. In one embodiment, the notification is sent by a component or another server which implements push technology (e.g., the notification server 150 shown in the example of FIG. 1). The push-enabled service can be implemented via long poll or HTTP streaming, for example, by the notification server 150 or another component, device which may be internal to or external to the host server 100. In addition, the host server 100 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, etc.).

One embodiment of the host server 100 includes the user interface module 735, which preserves or enhances user experience before, during, or after an upload request. For example, the user interface module 735 can allow the user to engage in other activities in the collaboration platform while an upload is in progress so as to prevent the user from having to wait for the completion to work in the platform.

In one embodiment, during the upload of a single file (before completion), the user can generally navigate away from the user interface through which the upload request was submitted, for example, via the navigation manager 740 in the user interface module 735. In other words, while a file or item upload is in progress, the user can navigate to other pages to perform other actions or initiate additional actions on the current page without interrupting (stopping or pausing) the in-progress upload.

Similarly, when a multi-file or multi-item upload request is in progress, the user can also navigate away from the user interface which the upload request was submitted prior to completion of the uploading of each of the multiple items to the host server 100. Navigation between pages during an upload of multiple files can also be managed by the navigation manager 740. For example, the upload of the multiple items can continue to proceed and is not interrupted if the user accesses a link on the user interface causing another user interface to launch in a browser. To enable bulk uploading, a new browser window is opened so it operates independently of user navigation. In addition, the web application for uploading and access of the collaboration environment is "pageless," meaning it can be updated asynchronously without a browser page refresh. This allows navigation and to start new uploads in other folders, which can be added to the upload queue.

In addition, during a multi-file upload, an item of the multiple items that has been uploaded to the host server 100 available for access through the user interface, even when some of the multiple items have not yet been uploaded to the host server, via the upload content access module 745, for example. Thus, during an active upload, individual files which have completed uploading can be accessed or interacted with by the user in the collaborative environment without having to wait for the full upload to complete.

In some instances, the item which has been uploaded to the host server is manipulatable by the user through the user interface, without a need for browser refresh. This enhances the user experience by allowing the user to work on the file or otherwise interact with it once it has been uploaded without waiting for other files to finish uploading. For example, the user can view, edit, preview, or comment on the item that has been uploaded, prior to completion of uploading all of the multiple items in an upload request. In one embodiment, buffer space in memory for storage of the individual work items are created in response to the upload request such that when individual items have been uploaded, they can be moved into the created buffer space, and subsequently permanent storage. When the file is in permanent storage, the user can then access and work on the individual item, while others are still being uploaded. In one embodiment, metadata for the file can be created before it is fully uploaded or processed, allowing faster user interaction. However, to actually interact with the file content (full content search, download or preview) the file generally needs to be processed as usual and be stored in permanent storage.

One embodiment of the host server 100 can include an SDK provisioning module 780 and a whitelist application manager 785. The SDK provisioning module 780 can provision SDKs, API keys/tokens, and the like to applications that have been approved for integration with the sending application. The SDK can include certain methods, iconography, and the like that allow inter-application communication and make the inter-application communication capability apparent to users of both applications. For example, the SDK can recognize encoded messages (e.g., custom Intents) broadcast by the sending application (e.g., the cloud-based collaboration platform application) and include response to method calls to facilitate various data access and transfer scenarios discussed above. The SDK can also include method calls to request keys from the host server, for example.

Applications that have integrated with the sending application by implementing the SDK, can be designated as a whitelisted application by the whitelist application manager 785. The whitelisted applications can receive automatic notifications of updates to SDKs, can make API calls to the host server, receive and respond to custom Intents, and the like.

In one embodiment of the host server 100, the inter-application transaction processor 765 can include a transaction key request detector 770 and a key generator 774. The transaction key request detector 770 can detect a key request for a transaction from a sending application and/or a receiving application. The detector 770 can identify a transaction request by a transaction ID and/or any other information relating to the transaction request such as the user ID, file name(s), file ID, time of transfer, receiving application ID, and the like. The transaction key request detector 770 can then trigger the key generator 774 to generate a key that can be directly used as an encryption key or that can be used to derive an encryption key for encrypting/decrypting the files associated with the transaction request. In one implementation, the transaction key request detector 770 can trigger the key generator 774 to generate a key for a transaction request only under certain conditions as discussed with respect to the transaction key request module 666. The transaction request detector 770, or another module can also send the generated key to the requesting application, and in some cases, to both applications involved in the transaction.

In one implementation, the key may be generated using a random number generator or a pseudorandom number generator that uses seed data, that can be a piece of user identifying information, for example. Alternately, any other key generation algorithms available in the art can be used. In one implementation, the encryption key may have an associated time stamp which can be used to determine the expiration date/time. In one implementation, the key generator 774 may generate a key suitable for an encryption method used. For example, if 256 bit AES encryption method is used in the mobile applications for encryption, a 256 bit key is generated.

In another embodiment, the inter-application transaction processor 765 can include an auth token request detector 772 and an auth token generator 776. The authentication token request detector 772 can receive an auth token request from a sending application and parse the request to obtain a user's credentials, such as a username/password, a pin code, a gesture, a fingerprint, retina scan, facial/voice recognition data, and the like. The authentication module 776 can obtain the parsed data and compare the data against data stored in a repository to verify that the user's credentials are correct. The authentication module 778 can trigger the token generator 776 to generate an auth token. The auth token generated by the token generator 776 can be sent to the sending application by the authentication module 778, the auth token request detector module 772 or another module. The auth token can be generated using various methods, and can be a numeric or alphanumeric string, for example. In one implementation, the auth token may be generated using a random number generator, a pseudorandom number generator with at least one piece of user identifying information as a seed, a hash, and/or the like.

Figure 8:
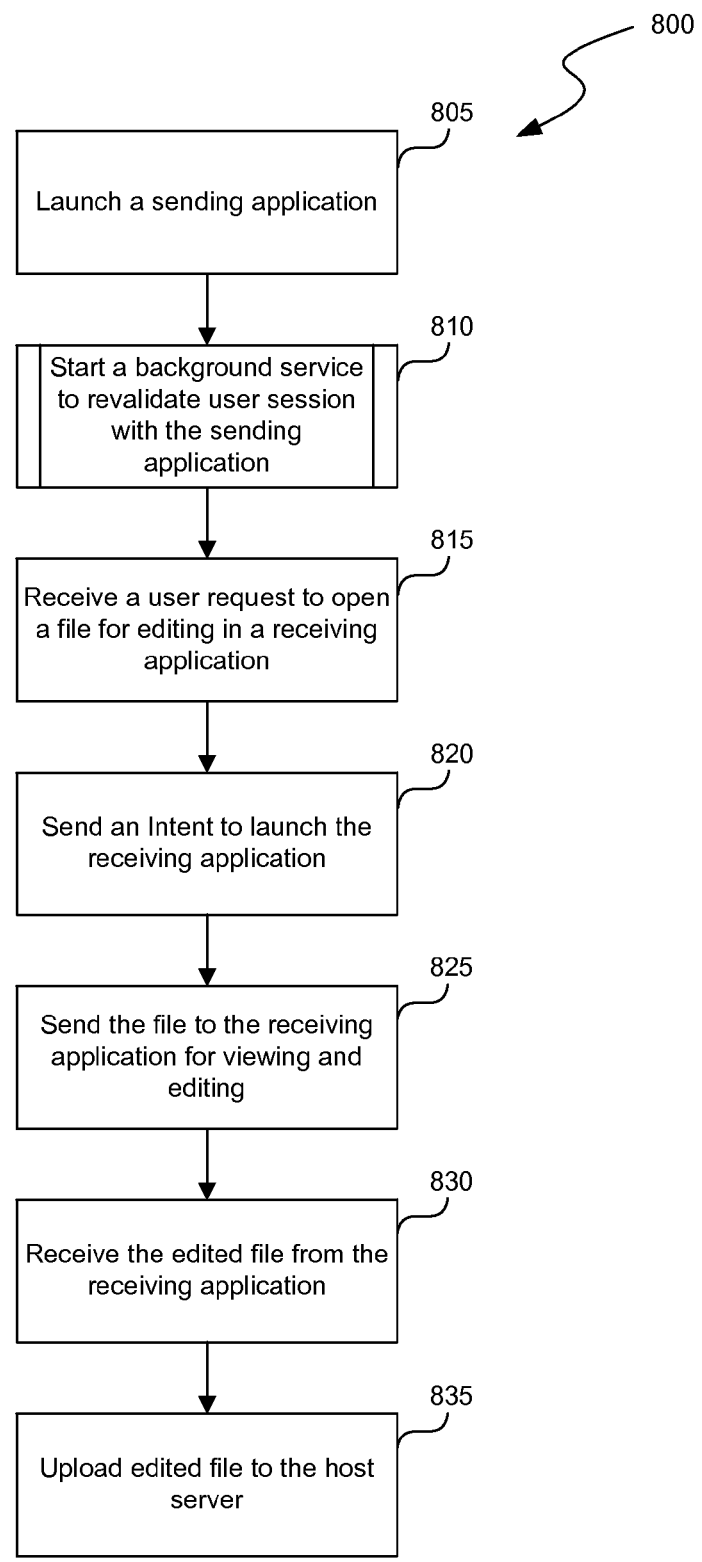
FIG. 8 depicts a logic flow diagram of an example method for initiating a background service and sending files back and forth between mobile applications.

FIG. 8 depicts a logic flow diagram of an example method 800 for initiating a background service and sending files back and forth between mobile applications. In one implementation, at block 805, a sending application is launched on a mobile device in response to a user request. At block 810, the sending application starts a background service that monitors the status of a user session and revalidates the user session with the sending application when necessary. The revalidation of the user session keeps a user logged in to the sending application, allowing the sending application to receive files uploaded by a receiving application. Details of block 810 are described in FIG. 9. The background service, in one implementation, can be implemented by the remote communication service 664.

At block 815, the sending application receives a transaction request that includes a request to open a file for editing in a receiving application. In response to the transaction request, the sending application creates and sends an Intent (e.g., a custom Intent) to detect and launch a receiving application qualified to handle the transaction request at block 820. For example, if the file is a PDF document, a mobile application that can open and allow editing of PDF files can be launched. By way of another example, if the file is an image file, an image processing application can be identified and/or selected as a receiving application. When a qualified receiving application is detected, at block 825, the file associated with the transaction request is sent to the receiving application for viewing and editing. The file is encrypted and sent as a data stream over a secure communication channel.

The receiving application can display the file, and allow editing and/or other manipulation on the file. The sending application can receive the edited file from the receiving application at block 830. The edited file can be a new version of the file sent, or a new file, in one implementation. At block 835, the sending application can send the edited file to a host server (e.g., host server 100) for cloud storage.

Figure 9:
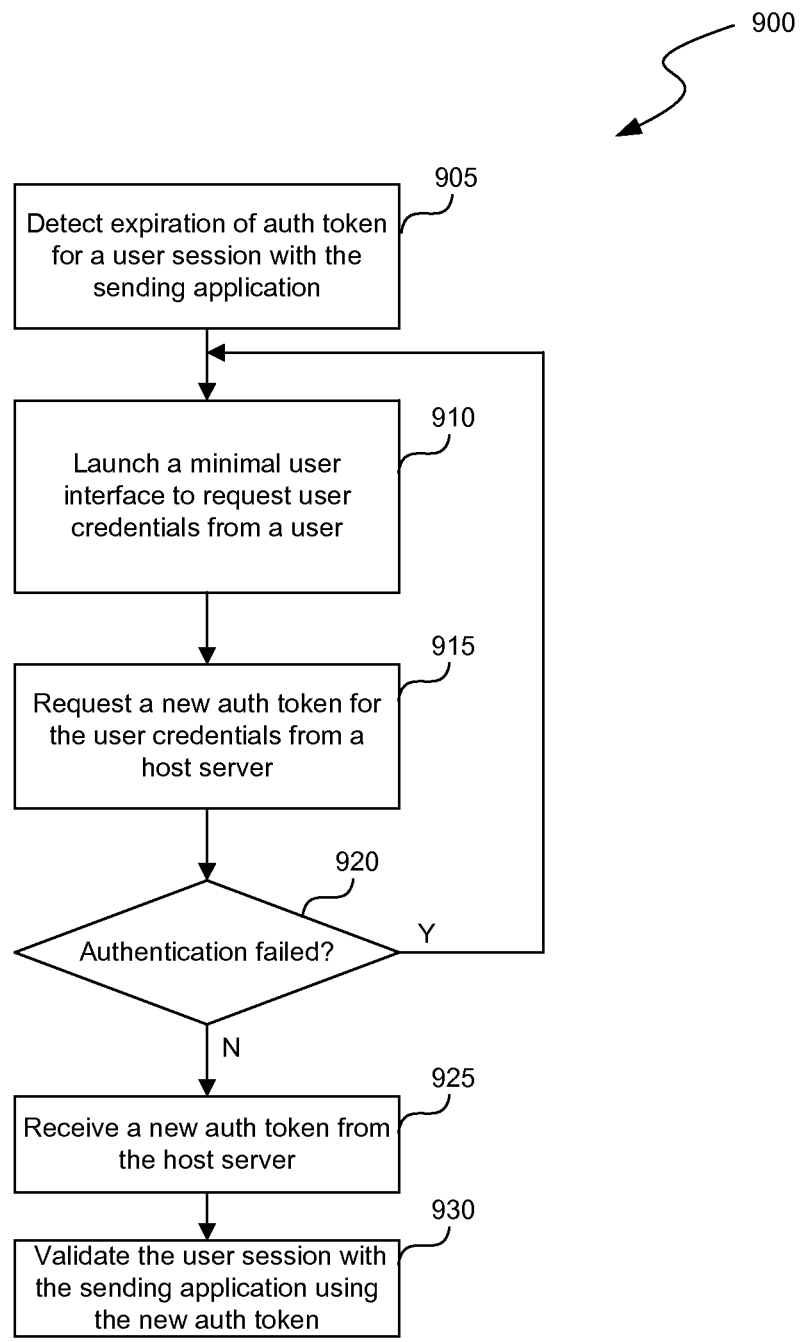
FIG. 9 depicts a logic flow diagram of an example method implemented by the background service for revalidation of the user session with a sending application.

Referring to FIG. 9, a logic flow diagram of an example method implemented by the background service for revalidation of the user session with the sending application is depicted. At block 905, the sending application can detect expiration of an auth token for a user session with the sending application or end of a user session with the sending application. In one implementation, whenever a termination event or a log out event is detected, the background service may check if the auth token is still valid (e.g., by using the auth token in a request to the host server, checking the time stamp, and the like) and may proceed to block 910 only if the auth token is invalid. Alternately, the background service may automatically proceed to block 910 if a termination or log out event is detected.

At block 910, the background service may launch a minimal user interface to request user credentials from the user to revalidate the user's session with the sending application. The minimal user interface may have the necessary fields for the requested credential such as an email address, user name/ID, password, pin code, gesture, and the like. In one implementation, the launching of the minimal user interface is via an Intent started by the service. At block 915, the background service can use the user credentials to request a new auth token from a host server such as the host server 100. The request may be made using an API call to the host server, for example.

In one implementation, if the authentication is successful as determined at decision block 920 based on a response from the host server, the process moves to block 925, where the new auth token is received from the host server. Alternately, the minimal user interface can be presented again for the user to re-enter the login credentials at block 910. Using the new auth token, the background service can revalidate the user session with the sending application at block 930. In one implementation, the background service can invoke a module (e.g., the authentication module 674) to revalidate the user session. In one implementation, evaluation of the authentication credentials (e.g., decision block 920) may be carried out on the client side or the server side.

Figure 10:
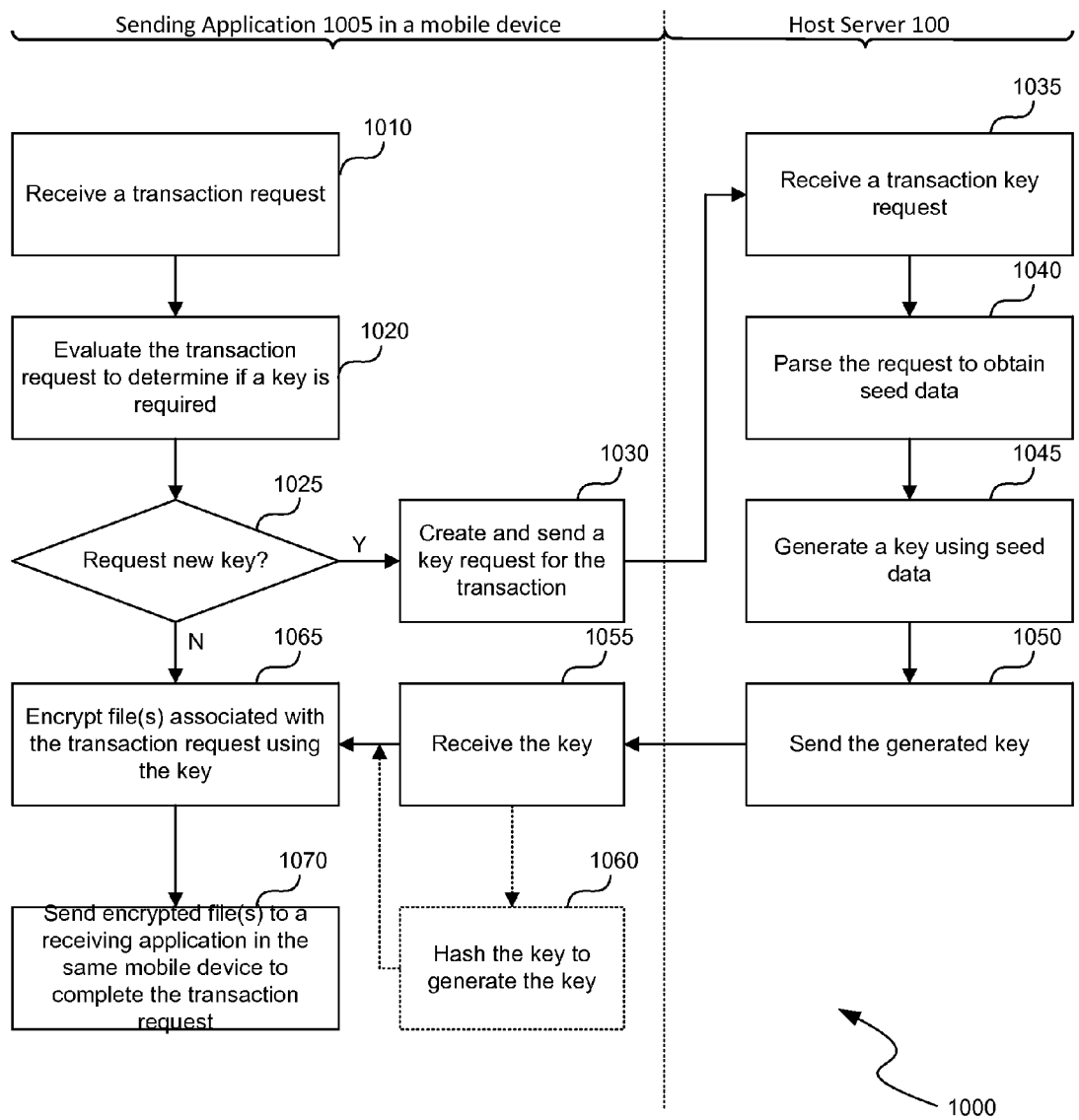
FIG. 10 depicts a logic flow diagram illustrating a file transfer transaction between a host server, the underlying Intent system and mobile applications using a server-based key generation service.

FIG. 10 depicts a logic flow diagram illustrating a file transfer transaction between the host server 100 and a sending application 1005 on a mobile device 102.

The sending application 1005 receives a file transfer transaction request at block 1010 from a user. In one implementation, a transaction request can include transfer of other data when commenting, assigning tasks, editing, deleting, writing, sharing, emailing, posting, and the like. The transaction request can include indications of one or more files to be transferred, an action to be performed on the files, and the like. At block 1020, the sending application 1005 can evaluate the transaction request to determine if a key should be requested from the host server for encrypting the files associated with the transaction request. In one implementation, the evaluation may be based on configurations defined by the sending application. For example, if the sending application is configured to request keys on a per transaction basis, the process moves to block 1030 where a key request is created and sent to the host server 100. Alternately, if the sending application is configured to request a key when certain conditions are met, the transaction request is evaluated at block 1020 to determine if the one or more conditions are met. For example, in one implementation, if a previously obtained key has been used a pre-defined number of times (e.g., 10 files) or for a predefined number of transaction requests (e.g., 10 transaction requests), a new key can be requested. In another implementation, a new key may be requested if the transaction request includes a receiving application with which the sending application has not transacted within a predefined time period (e.g., in the last hour). For example, a user may open a document from "Box" (i.e., sending application) in "EchoSign" (i.e., receiving application) to sign the document. The first transaction between "Box" and "EchoSign" can trigger acquisition of a new key, while subsequent transactions between the two applications occurring with an hour of the first transaction may be encrypted using the previously acquired key. Various other conditions, including those discussed with respect to the transaction key request module 666 can be implemented.

Based on the evaluation of the conditions for a key request, if a new key is required, the sending application creates and sends a key request to the host server 100 at block 1030. In one implementation, the transaction key request may be made via an API call to the host server 100. Information such as transaction ID, or other identifying information may be supplied along with the transaction key request.

At block 1035, the host server receives the transaction key request and parses the request at block 1040 to extract details of the request. The extracted information can be used as seed data when generating a new key at block 1045. In one implementation, the seed data can be any piece of data such as transaction ID, file ID, user ID, sending/receiving application ID, time stamp, and the like. As previously described with respect to the key generator module 772, various methods can be used to generate the key for the transaction. At block 1050, the generated key can be packaged and sent to the sending application 1005.

The sending application 1005 receives the key at block 1055. The sending application 1005 then encrypts the file(s) associated with the transaction request using the received key at block 1065. Alternately, if a new key was not requested, the previously obtained key may be used to encrypt the transaction file(s) at block 1065. At block 1070, the encrypted files are sent to a receiving application to complete the transaction request.

In one implementation of the method 1000, the key received from the host server 100 can be hashed to generate the encryption key for encrypting the file(s) in the transaction request. In yet another implementation of the method 1000, the host server 1000 may receive all transaction requests from the sending application, and may perform the processed of block 1020 and 1025.

Figure 11:
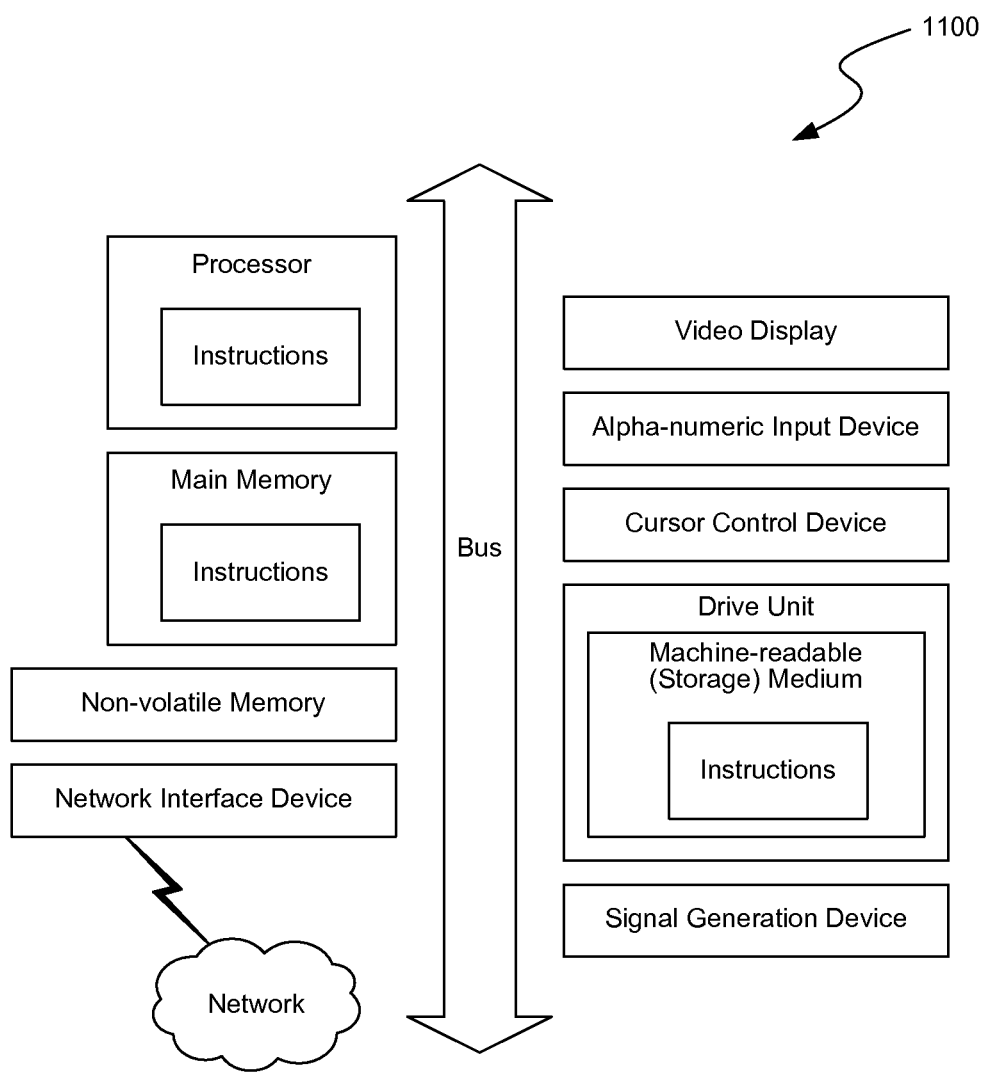
FIG. 11 shows a diagrammatic representation of a machine in the example form of a computer system within which a set of instructions, for causing the machine to perform any one or more of the methodologies discussed herein, may be executed.

FIG. 11 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disks, optical disks (e.g., Compact Disk Read-Only Memory (CD ROMS), Digital Versatile Disks, (DVDs), etc.), among others, and transmission type media such as digital and analog communication links.

The network interface device enables the machine 1100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, 16, other aspects may likewise be embodied as a means-plus-function claim, or in other forms, such as being embodied in a computer-readable medium. (Any claims intended to be treated under 35 U.S.C. §112, 16 will begin with the words "means for".) Accordingly, the applicant reserves the right to add additional claims after filing the application to pursue such additional claim forms for other aspects of the disclosure.

We claim:

1. A method for maintaining data portability between mobile applications, including a first mobile application and a second mobile application, in a data sharing environment on a mobile device, comprising:
   detecting expiration of an authentication token associated with a user and the first mobile application;
   presenting a user interface to obtain information identifying the user to authenticate the user without the user having to switch from the second mobile application to the first mobile application to enter login credentials for authentication;
   requesting a new authentication token from a host server associated with the first mobile application; and
   authenticating the user with the first mobile application using the new authentication token from the host server to allow direct upload of one or more files from the second mobile application to the first mobile application, wherein the one or more files are received by the second mobile application from the first mobile application in response to a user request identifying the second mobile application as a recipient of the one or more files.

2. The method of claim 1, further comprising:
   maintaining a connection to the host server associated with the first mobile application.

3. The method of claim 2, wherein a service started by the first mobile application runs in the background of the operating system to maintain the connection to the host server and request the new authentication token from the host server.

4. The method of claim 1, wherein the new authentication token is generated at the host server using at least some of the information identifying the user received from the mobile device.

5. The method of claim 1, wherein the first mobile application provides access to a cloud-based storage service that is hosted on the host server.

6. The method of claim 1, wherein the second mobile application allows the user to open and modify one or more files.

7. The method of claim 1, wherein the one or more files are new versions of one or more files received from the first mobile application for opening and editing using the second mobile application.

8. A mobile device providing data portability between mobile applications, comprising:
   a memory;
   a first application and a second application stored in the memory;
   the first application including processor-executable instructions to:
      start a service in the background to keep a user session with the first application alive, wherein the service detects the end of a user session with the first application and requests an authentication token from the remote server to revalidate the user session;
      receive a user request to open a file in a second application;
      securely encrypt and transfer the file to the second application;
   the second application including processor-executable instructions to:
      receive the file transferred by the first application;
      decrypt the file;
      receive modifications to the file from a user;
      securely encrypt and transfer the modified file to the first application, wherein the user session with the first application is kept alive by the service during a period of user inactivity in the first application.

9. The mobile device of claim 8, wherein the first mobile application provides access to a cloud-based storage service that is hosted on the host server.

10. The mobile device of claim 8, wherein the first application includes processor-executable instructions to: generate and display a user interface to obtain information identifying the user without the user having to switch from the second mobile application to the first mobile application.

11. A method for secure file portability between mobile applications on a mobile device, comprising:
receiving multiple transaction requests to transfer files between a first mobile applications and a second mobile application on the mobile device;
for each transaction request,
requesting an encryption key from a host server, wherein the encryption key is requested by the respective first mobile application or the second mobile application making the transaction request;
encrypting a file associated with the transaction request with the encryption key;
executing the transaction request by transferring the encrypted file from the first mobile application to the second mobile application or vice versa; and
wherein the first mobile application is one of an application providing access to a cloud-based storage service provided by the host server or an application for viewing and modifying files.

12. The method of claim 11, wherein encrypting the file includes encrypting data streams of the file and transferring the encrypted file includes transferring the encrypted data streams.

13. The method of claim 11, wherein the host server is associated with one of the first mobile application and the second mobile application.

14. The method of claim 11, further comprising:
sending the encryption key to the second mobile application for decrypting the encrypted file.

15. The method of claim 11, wherein the second mobile application obtains a decryption key from the host server for decrypting the encrypted file.

16. A mobile device providing secure file portability between mobile applications on the mobile device, comprising:
an inter-application transaction request detector module stored in a memory of the mobile device and configured to:
receive a transaction request from a first mobile application, wherein the transaction request is for a transfer of one or more files from the first mobile application to a second mobile application;
a key request module stored in the memory of the mobile device and configured to:
request an encryption key from a host server associated with the first mobile application; and
encrypt a file associated with the transaction request with the encryption key;
a module configured to:
execute the transaction request by transferring the encrypted file from the first mobile application to the second mobile application;
wherein one of the first and second mobile applications is a cloud-based collaboration platform application and the other of the first and second mobile applications is an application for opening and editing files.

17. The mobile device of claim 16, wherein the key request module is further configured to encrypt a predefined number of files per transaction request.

18. The mobile device of claim 16, wherein the key request module requests an encryption key from the host server on a per transaction basis.

19. A server-based key generation method for secure file portability between mobile applications on a mobile device, comprising:
receiving a request for an encryption key from a mobile application on the mobile device;
evaluating the request to determine whether the request meets a condition for generating an encryption key;
wherein the condition specifies generating the encryption key when the request is associated with a file transfer transaction between the requesting mobile application and a target mobile application occurring for the first time;
generating an encryption key if the request meets the condition for generating the encryption key; and
sending the encryption key to the requesting mobile application on the mobile device for encryption of one or more files associated with the file transfer transaction;
wherein the mobile application is one of a cloud-based collaboration platform application or application for opening and editing files.

20. The method of claim 19, further comprising sending the encryption key to the target mobile application for decrypting the one or more files received from the requesting mobile application.

21. The method of claim 20, wherein the sending is in response to a request for a decryption key from the target mobile application.

22. The method of claim 21, wherein the requesting mobile application is the cloud-based collaboration platform application and the target application is an application for opening and editing the one or more files.

23. The method of claim 19, wherein the same encryption key is used to encrypt one or more files associated with a subsequent file transfer transaction occurring within a predefined time period of the file transfer transaction occurring for the first time.

24. A non-transitory machine-readable storage medium storing instructions which when executed by a mobile device causes the mobile device to perform a method of maintaining data portability between mobile applications, including a first mobile application and a second mobile application, in a data sharing environment on the mobile device, comprising:
instructions for detecting expiration of an authentication token associated with a user and the first mobile application;
instructions for presenting a user interface to obtain information identifying the user to authenticate the user without the user having to switch from the second mobile application to the first mobile application to enter login credentials for authentication;
instructions for requesting a new authentication token from a host server associated with the first mobile application; and
instructions for authenticating the user with the first mobile application using the new authentication token from the host server to allow direct upload of one or more files from the second mobile application to the first mobile application, wherein the one or more files are received by the second mobile application from the first mobile application in response to a user request identifying the second mobile application as a recipient of the one or more files.

25. The machine-readable storage medium of claim 24, further comprising:
   instructions for maintaining a connection to the host server associated with the first mobile application.

26. The machine-readable storage medium of claim 24, wherein a service started by the first mobile application runs in the background of the operating system to maintain the connection to the host server and request the new authentication token from the host server.

* * * * *